Patented Jan. 20, 1942

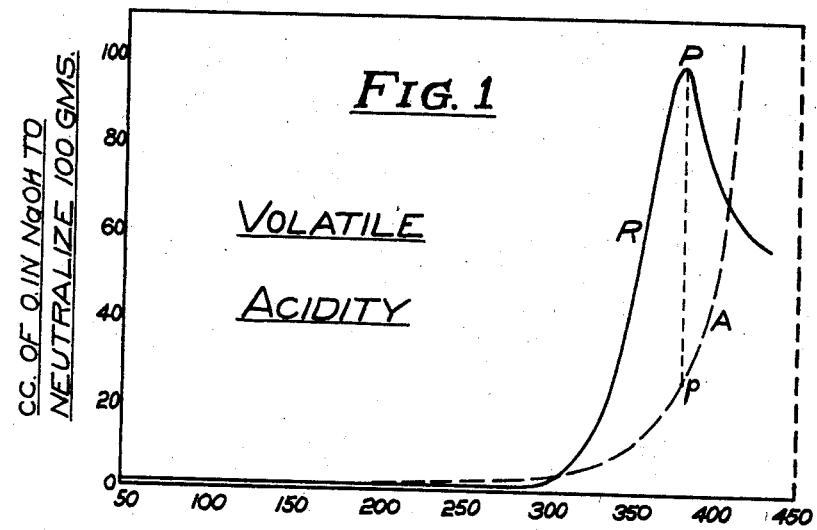
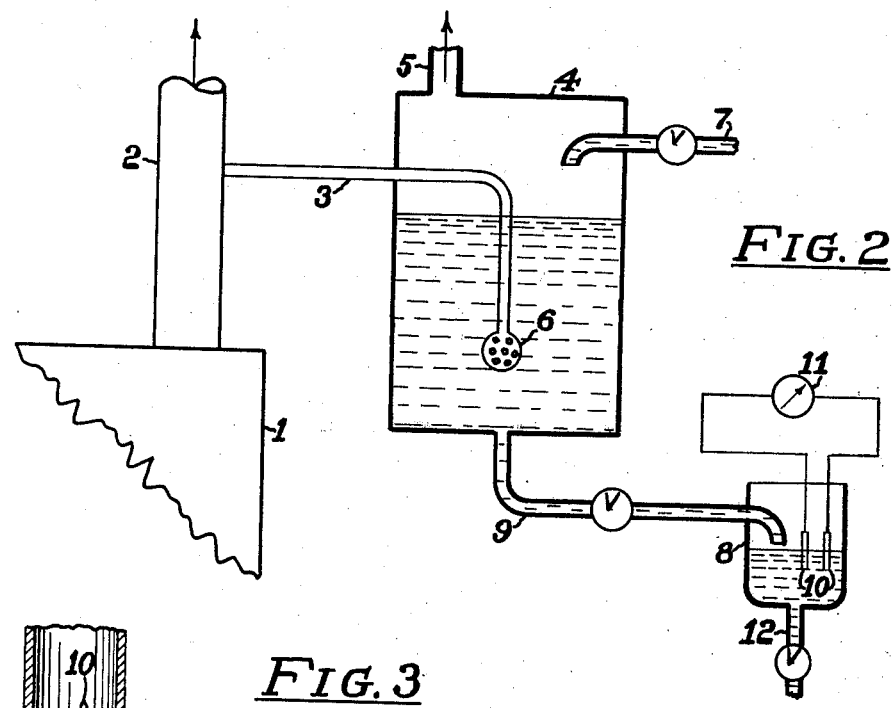
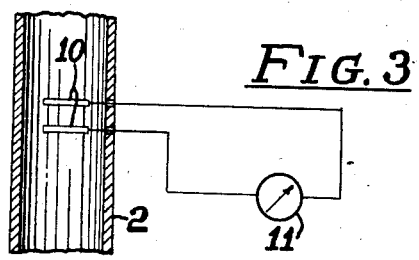

2,270,768

UNITED STATES PATENT OFFICE 2,270,768

ANALYTIC ROASTING CONTROL AND METHOD

Herbert S. Polin, New York, N. Y., and Joseph F. Aims, Teaneck, N. J., assignors to The Great Atlantic and Pacific Tea Company, a corporation of New Jersey Application July 29, 1939, Serial No. 287,264

4 Claims. (Cl. 99—68)

This invention relates to improvements in methods of treating coffee or other vegetable product, and especially to a process for roasting coffee beans so as to indicate the attainment of the desired state or condition of the coffee which is suitable for the preparation of the beverage usually obtained therefrom.

In the operation of roasting, various changes, chemical and physical, in the make-up of the coffee bean of course ensue. The bean not only becomes drier and more brittle, but also by chemical reaction new substances are formed in the bean, and these have a more or less marked effect upon the taste of the coffee when the beans are ground and extracted with boiling water in preparation as a beverage. Some of the substances, whether created while the roasting is in progress or otherwise arising, are of no special importance; while others, and specifically certain organic acids, must be dealt with very carefully if coffee of the right flavor is to be produced.

It has been found that such acids originate in the coffee bean after the roasting begins, and when a more or less predetermined range of temperature has been reached. The principal object of this invention is to provide a means for determining the state of the roast, or particularly the moment at which the roasting coffee reaches its state of "optimum" taste and aromatic characteristic, by measuring certain of the compounds either in the coffee, or expelled from the coffee during the roasting process, and particularly by measurements of the volatile acids driven off from the roasting coffee for the period or duration of the roasting operation.

Experiments with all of the prominent types of coffee have demonstrated that the roasting must proceed to a particular stage if the beverage made from the coffee by infusing with hot water is to have the best or "optimum" taste. For example, in any of the ordinary roasters now employed, the coffee is heated through a selected interval of time to a temperature which is found to be correct to impart to the coffee the required properties. The acceptable time and temperature from a standpoint of beverage taste, are now arrived at by heating separate samples through longer and longer intervals and at higher and higher temperatures. The samples are each made into coffee beverage and tasted; and the one having the best taste determines the mode of roasting the entire batch. This is not practically satisfactory, for a large coffee shipment may contain coffee beans of varying physical characteristics. Thus if temperature control be the determinant for the conclusion of a roast, the variation, say, of moisture content or age of the bean since leaving the tree or other factor would cause one portion of the batch to react differently from another portion at the same temperature. Likewise, if time-temperature be the method of control, the results will also vary from one batch to another.

The actual ingredients in the coffee to which the so-called optimum taste may be due need not be ascertained or discussed, but this invention takes into account the novel discovery that there is a well-defined condition of the roasted coffee at which "optimum" taste is given, and this condition is distinguished by a degree of acidity of the coffee caused by the presence therein of the organic acids already referred to, in limited relative amounts. Hence, by carrying on the roasting until the acidity has a predetermined value or degree, the required manner of roasting is revealed and an indication of the point at which the roasting must be stopped is established.

Such organic acids are generally volatile, and are partly expelled after they form by the heat of the roasting. The rate of expulsion accelerates until the amount of the acids which form no longer increases in the coffee, but starts to decrease. This point constitutes the indication in the neighborhood of which the roasting may be terminated.

An important feature in the invention is the discovery that the volatile acid curve bears a direct relation to the taste and aroma developed in the coffee by the process of roasting.

The chief object of this invention is to provide a method of roasting coffee embracing steps during which the organic acids are formed and driven off, until the quantity remaining, or residual in the coffee, corresponds to the quantity that is indicative of the state of the coffee which affords the best taste for drinking.

The invention will be clearly set forth in the following detailed description, which states further objects and advantages thereof, and is to be read in connection with the accompanying drawing illustrating the principle of the invention and the manner in which it is performed.

Figure 1 presents curves which are explanatory of the nature of the method or process; and Figure 2 shows diagrammatically apparatus for indicating the condition of the coffee with regard to the organic acidity thereof, while the roasting proceeds, as a step in determining the condition to be imparted to the coffee for purposes of this invention; and Figure 3 shows another form of indicating device.

In Figure 1, which presents a chart plotted horizontally for temperatures and duration of roasting, and vertically for the amount of organic acidity generated in roasting coffee, the curve R shows the amount of organic acids at various stages in samples of coffee treated in the roaster. At about the point marking the temperature of 300° F. on this chart, the acids begin to form, and they increase in quantity in the coffee bean very rapidly to a maximum and then fall off. This curve may be obtained by taking separate samples of the coffee, heating the samples separately to successively higher temperatures, and then testing them by the methods of chemical analysis to ascertain the amount of acidity which they contain. The test may be applied by determining how much sodium hydroxide is necessary to neutralize the acids remaining in each sample after heating. For each sample of the same mass in any one batch, the maximum amount of acidity that can be produced is very nearly constant.

During the heating, the acids which are formed are also expelled in part, because they are volatile. The quantity of such acids which are driven off is indicated by the curve A, which rises more and more steeply as the heating proceeds. When these acids begin to be volatilized at a greater rate than they are formed, the amount left in the coffee begins to decrease. The curve R is the curve of residual acidity, or the amount formed less the amount expelled. Hence, when the rate of volatilization rises sharply, the amount of acids in the coffee falls off.

It has been found as a result of numerous trials that if samples of coffee are taken and roasted in this way, at successively higher temperatures, a sample which is roasted to a point in proximity to the peak P of the curve R will give the optimum taste. But it is not practical to plot the curve R for every batch of coffee to be roasted, because of the time involved, and the impossibility of conducting this operation during the critical portion of the roasting cycle. However, the curve A is correlated to the curve R, and the ordinate through the peak P on the latter gives a point $p$ in the former, where the quantity of acids driven off will show that the state represented by point P of the curve R has been reached. If several samples of coffee are separately roasted in the neighborhood of this point $p$, and on both sides of it, and the amount of organic acids driven off from each is measured, the one which tastes best when made into coffee furnishes the indication to be followed. The batch is simply roasted until the quantity of organic acids volatilized from it corresponds to that given off by the sample; and the batch of coffee will then be found, when taken from the roaster, to be in the state or condition which gives the best taste and flavor for drinking.

Successive roasts of any variation in type may then be reproduced in exact accordance with the acceptable taste and aroma standard as selected by the taste expert.

Figure 2 shows diagrammatically apparatus by which the steps for arriving at the indication this process yields can be carried out. At 1 is illustrated a coffee roaster having an outlet flue 2, and a portion of the gases discharged from the roaster through this flue is diverted through a pipe 3 into a casing 4; which has a connection 5 leading to an exhausting device, so that a partial vacuum can be created or generated in the casing 4. Flue gases thus forced to enter the casing pass through a diffuser 6, which is below the level of water in the casing 4, supplied through a pipe 7. The volatilized acids thus mix with the water, and the acid liquid is transferred to a cell or receptacle 8 through pipe 9. This cell contains electrodes 10 connected by wires to an electrical indicating instrument 11. This cell 8 can be emptied through a drainpipe 12.

With this apparatus, the acidity of the gases in the outlet flue of the roaster can be measured. As soon as the degree of acidity is the same as that noted in connection with the approved sample, the roasting is stopped.

The nature of the process will now be clear. With the roaster connected to the apparatus, the vacuum is started and the water turned on at 7 and allowed to run into the chamber 4. Gaseous acids enter the chamber, and are absorbed in the water; the liquid runs through pipe 9 into the cell 8, and the drain 12 may be open to prevent overflow of the cell 8. Hence the cell 8 will fill with the acidified liquid, and the degree of acidity will be shown on the indicator 11. The water will be run continuously into the chamber 4, and the acidified liquid will pass continuously into the cell 8 and out by way of pipe 12 while the roasting is in progress.

When the reading on the instrument 11 is the same as that given by the approved sample, it is clear that it indicates the condition of the coffee necessary for optimum taste. The bulk of the coffee-roasting operation is now completed, and the desired condition or state of the coffee is assured.

A caustic solution may be supplied by the pipe 7 to serve as an absorption medium instead of water, if desired.

The apparatus outlined in Figure 2 may of course be altered. Electrodes such as illustrated at 10 may be mounted in the flue 2, so as to be in direct contact with the gases, and by connection to suitable apparatus, the necessary indication or reading such as is given by the instrument 11, may be obtained as described. See Figure 3.

From the foregoing, it will be seen that this method of treating coffee affords a reliable indication of the completion of the roasting and the attainment of the state or condition required for the best taste, and while one mode of proceeding is set forth, the invention is by no means strictly limited thereto, but may be varied in details in actual practice as fully as is consistent with the scope and spirit thereof.

The invention having been thus described, what is believed to be new and entitled to protection by Letters Patent of the United States is:

1. The method of treating coffee beans or the like to prepare same for production of beverage having optimum flavor, consisting in roasting the beans to expel part of their ingredients in the form of gases, concurrently testing such gases to determine the rate of expulsion of acid gases, and terminating the roasting when such gas testing reveals that the rate of expulsion of acid gases greatly increases.

2. The method of treating coffee to prepare same for production of beverage having optimum taste, consisting in roasting the coffee to expel part of its ingredients in the form of gases, testing the degree of acidity of the gases as expelled therefrom until a marked increase in such degree of acidity is noted, and then stopping the roasting operation.

3. The method of treating coffee to prepare same to give a beverage of optimum taste, consisting in roasting the coffee to expel part of its ingredients in the form of gases, conducting gas expelled from the coffee while roasting into an absorption medium, while testing said medium to reveal the rate of expulsion of such gases other than water vapor, and terminating the roasting when such tests indicate a marked increase in said rate.

4. The method of treating coffee consisting in roasting the coffee to expel part of its ingredients in the form of gases, mixing gases expelled from the coffee while the roasting continues, with a medium to absorb same, testing and indicating electrically the acidity of said medium as affected by the gas therein, and stopping the roasting when said medium reaches a predetermined acidity as thus electrically indicated.

HERBERT S. POLIN.
JOSEPH F. AIMS.